(12) United States Patent
Kong et al.

(10) Patent No.: US 11,971,001 B2
(45) Date of Patent: Apr. 30, 2024

(54) BATTERY ASSEMBLY AND ELECTRICALLY STARTED GASOLINE ENGINE HAVING BATTERY ASSEMBLY

(71) Applicant: SUZHOU CLEVA PRECISION MACHINERY AND TECHNOLOGY CO., LTD., Suzhou (CN)

(72) Inventors: Zhao Kong, Suzhou (CN); Ning Guo, Suzhou (CN); Xiaoping Cai, Suzhou (CN); Guangyue Zhu, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 768 days.

(21) Appl. No.: 16/610,653

(22) PCT Filed: May 8, 2018

(86) PCT No.: PCT/CN2018/085924
§ 371 (c)(1),
(2) Date: Nov. 4, 2019

(87) PCT Pub. No.: WO2018/202207
PCT Pub. Date: Nov. 8, 2018

(65) Prior Publication Data
US 2020/0056575 A1    Feb. 20, 2020

(30) Foreign Application Priority Data

May 3, 2017   (CN) .......................... 201710305812.0

(51) Int. Cl.
*F02N 11/08*   (2006.01)
*H01M 10/04*   (2006.01)
(Continued)

(52) U.S. Cl.
CPC ......... *F02N 11/0862* (2013.01); *H01M 10/04* (2013.01); *H01M 50/107* (2021.01); *H01M 50/14* (2021.01)

(58) Field of Classification Search
CPC ............. F02N 11/0862; H01M 50/183; H01M 50/172; H01M 10/04
See application file for complete search history.

(56) References Cited

FOREIGN PATENT DOCUMENTS

| CN | 202749939 U | 2/2013 |
|----|----|----|
| CN | 103904260 A | 7/2014 |

(Continued)

OTHER PUBLICATIONS

Machine Translation of CN202749939 (Year: 2022).*
(Continued)

*Primary Examiner* — Stewart A Fraser
(74) *Attorney, Agent, or Firm* — JK Intellectual Property Law, PA

(57) ABSTRACT

A battery assembly includes a battery pack; a battery pack seat for mounting the battery pack, the battery pack seat having a base for creating an electrical connection with the battery pack; and a sealing member arranged between the battery pack and the base. The base has a first terminal, and the battery pack has a second terminal matched with the first terminal. One of the first terminal and the second terminal penetrates the sealing member for creating the electrical connection via the other one of the first terminal and the second terminal. A related electrically started gasoline engine is also disclosed.

12 Claims, 15 Drawing Sheets

(51) Int. Cl.
  *H01M 50/107* (2021.01)
  *H01M 50/14* (2021.01)

(56) References Cited

FOREIGN PATENT DOCUMENTS

| | | |
|---|---|---|
| CN | 206931622 U | 1/2018 |
| CN | 206977207 U | 2/2018 |
| JP | H02274128 | 11/1990 |
| JP | 2014093231 A | 5/2014 |
| WO | WO 2016065128 A1 | 4/2016 |

OTHER PUBLICATIONS

Machine Translation of WO2016065128 (Year: 2022).*
International Search Report for Application No. PCT/CN2018/085924, dated Jul. 25, 2018.

* cited by examiner

BATTERY ASSEMBLY AND ELECTRICALLY STARTED GASOLINE ENGINE HAVING BATTERY ASSEMBLY

CROSS-REFERENCE TO RELATED PATENT APPLICATIONS

This application is a national stage of International Application No. PCT/CN2018/085924, filed on May 8, 2018 which claims priority to CN Patent Application No. 201710305812.0, filed on May 3, 2017. All of the aforementioned applications are hereby incorporated by reference in their entireties.

TECHNICAL FIELD

The disclosure relates to a battery assembly and an electrically started gasoline engine with the same.

BACKGROUND

At present, some available small gasoline engines adopt an electric control system, such as an electric start system, and the small gasoline engines are started by supplying power to a battery pack. However, in the practical use process, that the following situations often happen:

1. Since the small gasoline engine basically works outdoors, people often face rainy days. After the small gasoline engine works for a period of time in rainy days, people often find that the battery pack generates heat and burns, and it is not difficult to imagine that this is caused by short circuit of a battery core due to water entering the battery pack. This situation will present a safety hazard.

2. After the small gasoline engine is placed outdoors for a period of time in rainy days, water may be accumulated on the electric start circuit board in the battery pack when the small gasoline engine is started, and the battery or the circuit board can be immediately short circuited when the power supply is switched on again under the unknown condition. This not only affects the normal work of gasoline engine, but also brings very big potential safety hazard.

3. Because the battery pack on the small gasoline engine has potential safety hazard and does not conform to the people-oriented current social idea, the defect needs to be improved urgently.

4. After the small gasoline engine is placed in the rain for a period of time, rainwater can possibly enter the starter motor, and when turning on the starting switch, the inside of the motor would be short-circuited, parts can be damaged, normal work of the gasoline engine is affected, and even potential safety hazards are brought.

Technical Solution

An object of the present disclosure is to provide a battery assembly with good waterproofing.

To achieve the above object, the present disclosure provides battery assembly, comprising a battery pack and a battery pack seat for installing the battery pack, wherein the battery pack seat has a base for achieving an electric connection with the battery pack, the battery assembly further comprises a sealing member arranged between the battery pack and the base, the base is provided with a first terminal which provided on the upper surface of the base matched with the battery pack, the battery pack is provided with a second terminal matched with the first terminal, the second terminal is provided on the under surface of the battery pack, and one of the first terminal and the second terminal penetrates the sealing member to achieve the electric connection with the other one of the first terminal and the second terminal.

As a further improvement of the embodiment of the present disclosure, one of the upper surface and the under surface of the battery pack is provided with a mounting groove in which the sealing member is mounted.

As a further improvement of the embodiment of the present disclosure, the depth of the mounting groove is smaller than the thickness of the sealing member.

A battery assembly may include a battery pack and a battery pack seat for mounting the battery pack, wherein the battery pack seat has a base for achieving an electric connection with the battery pack, the battery assembly further comprises a sealing member disposed between the battery pack and the base, the base is provided with a first terminal which is arranged on the upper surface of the base matched with the battery pack, the battery pack is provided with a second terminal matched with the first terminal, the second terminal is arranged on the under surface of the battery pack, one of the first terminal and the second terminal penetrates the sealing member to achieve the electric connection with the other one of the first terminal and the second terminal, a protrusion portion is arranged on one of the upper surface and the under surface of the battery pack, the protrusion portion is annularly arranged around the first terminal or the second terminal, and the area annularly surrounded by the protrusion portion is smaller than that of the sealing member.

As a further improvement of the embodiment of the present disclosure, the sealing member is mounted on the upper surface, the protrusion portion is provided on the under surface of the battery pack, the second terminal is configured as a socket, and the protrusion portion is annularly provided around the socket.

As a further improvement of the embodiment of the present disclosure, the sealing member is mounted on the under surface of the battery pack, the protrusion portion is provided on the upper surface, the first terminal is configured as a socket, and the protrusion portion is annularly provided around the socket.

As a further improvement of the embodiment of the present disclosure, the protrusion portion has a tip end.

The disclosure also provides an electrically started gasoline engine with good waterproofing, which comprises a body, a cylinder arranged in the body, a piston reciprocating in the cylinder, a crankshaft linked with the piston, a speed reducing unit driving the crankshaft to rotate during starting and a motor driving the speed reducing unit to work, and the electrically started gasoline engine further comprises the above battery assembly, wherein the battery assembly is used to supply electric power to the motor.

As a further improvement of the embodiment of the disclosure, the electrically started gasoline engine further comprises a motor mounting portion and a waterproof jacket, the motor mounting portion has a motor accommodating cavity, the motor has a first end for outputting torque and a second end opposite to the first end, at least part of the first end is mounted in the motor accommodating cavity, the waterproof jacket is sleeved at the second end, the waterproof jacket has an open end and a closed end, and the open end is in sealing connection with the motor mounting portion.

As a further improvement of the embodiment of the present disclosure, a positioning protrusion is provided on the outer side of the motor mounting portion, and the open end is provided with a positioning groove matched with the positioning protrusion.

As a further improvement of an embodiment of the present disclosure, the positioning groove is configured as a blind hole capable of wrapping the positioning protrusion.

As a further refinement of an embodiment of the present disclosure, the motor has a cable extending from the second end, and the closed end is provided with a cable through hole, from which the cable can protrude.

As a further improvement of the embodiment of the present disclosure, a cable fixing portion is provided on the outer peripheral surface of the waterproof jacket, and the cable fixing portion is configured as a through hole through which the cable protruding from the cable through hole is inserted.

As a further improvement of the embodiment of the present disclosure, the second end of the motor has a plurality of first exhaust holes extending in the circumferential direction, the waterproof jacket is provided with at least one second exhaust hole corresponding to at least one position of the plurality of first exhaust holes, and the at least one second exhaust hole is located at the lower portion of the motor.

As a further improvement of the embodiment of the present disclosure, the second end of the motor has a plurality of first exhaust holes extending circumferentially, the waterproof jacket has a second exhaust hole offset from the first exhaust holes in circumferential direction, an exhaust passage is provided between the waterproof jacket and the housing of the motor, and the exhaust passage fluidly connects the first exhaust holes and the second exhaust hole.

As a further improvement of the embodiment of the present disclosure, the second exhaust holes are located at the lower portion of the motor, the number of the first exhaust holes is three, and the three first exhaust holes are located above and on two sides of the motor respectively.

As a further improvement of the embodiment of the present disclosure, at least the open end of the waterproof jacket is made of an elastic material, and the open end is sleeved outside the motor mounting portion through elastic deformation.

As a further improvement of the embodiment of the present disclosure, the waterproof jacket is provided with a shoulder portion between the open end and the closed end, the inner diameter from the shoulder portion to the open end portion is larger than the inner diameter from the shoulder portion to the closed end portion, the waterproof jacket is connected with the motor mounting portion, and the shoulder portion can abut against the motor mounting portion.

Compared with the prior art, the disclosed subject matter has the advantages that: in case of the battery assembly according to the present disclosure, a sealing member is arranged between the battery pack and the base, one of the first terminal and the second terminal penetrates the sealing member to achieve electric connection with the other one of the first terminal and the second terminal, so that external water is prevented from entering the battery pack and/or the battery pack seat, thereby avoiding short circuit and damage of parts after water enters the battery pack and/or the battery pack seat, and eliminating potential safety hazards during use of the battery pack. The electrically started gasoline engine adopts the above battery assembly, so that potential safety hazards when the battery pack is used are eliminated, and the electrically started gasoline engine is safer and more reliable to use.

In order to achieve the object, the disclosure also provides a battery pack, comprising a housing consisting of a front cover and a rear cover, and a battery core, wherein the housing is provided with an inner cavity for accommodating a battery core, the battery core is arranged in the inner cavity, the front cover comprises a first surrounding wall which surrounds a part of the inner cavity, the rear cover comprises a second surrounding wall which surrounds another part of the inner cavity, the front cover further comprises a first outer wall positioned outside at least part of the first surrounding wall, the rear cover further comprises a second outer wall positioned outside at least part of the second surrounding wall, a groove portion is provided on one of the first surrounding wall and the second surrounding wall, a protrusion portion is provided on the other of the first surrounding wall and the second surrounding wall, the front cover and the rear cover are inserted into the groove portion through the protrusion portion to form the inner cavity and an outer cavity which is independent relative to the inner cavity, the outer cavity is enclosed by the first outer wall, the second outer wall, at least part of the first surrounding wall and at least part of the second surrounding wall, and a drain hole communicated with the outside is provided in the outer cavity.

As a further improvement of the embodiment of the present disclosure, the drainage area of the drain hole is not smaller than the area of a circular hole having a diameter of 6 mm.

As a further improvement of the embodiment of the present disclosure, the drain hole is provided in the rear cover.

As a further improvement of the embodiment of the present disclosure, the bottom of the battery pack is provided with a socket for realizing electric connection and a protrusion portion, and the protrusion portion is annularly arranged around the socket.

As a further improvement of the embodiment of the present disclosure, the protrusion portion has a tip end.

Compared with the prior art, the disclosure has the advantages that: in cased of the battery pack according to the present disclosure, through providing the drain hole on the outer cavity of the battery pack, external water is prevented from entering the battery core, and meanwhile, the water entering the outer cavity of the battery pack housing can be drained, and therefore, short circuit and damage to parts caused by water entering the battery core are avoided, and potential safety hazards during use of the battery pack are eliminated. The electrically started gasoline engine adopts the waterproof structure of the battery core in the above battery pack, and eliminates the potential safety hazard when the battery pack is used, so that the electrically started gasoline engine is safer and more reliable to use.

Another object of the present disclosure is to provide a safe and reliable waterproof motor structure.

To achieve the above object, the present disclosure provides a waterproof motor structure, comprising a motor mounting portion, wherein the motor mounting portion has a motor accommodating cavity, the motor has a first end for outputting torque and an opposite second end, the first end is at least partially mounted in the motor accommodating cavity, the waterproof motor structure further comprises a waterproof jacket sleeved on the second end, the waterproof jacket has an open end and a closed end, and the open end is in sealing connection with the motor mounting portion.

As a further improvement of the embodiment of the present disclosure, a positioning protrusion is disposed on the outer side of the motor mounting portion, and a positioning groove matched with the positioning protrusion is disposed at the open end.

As a further improvement of an embodiment of the present disclosure, the positioning groove is configured as a blind hole capable of wrapping the positioning protrusion.

As a further refinement of an embodiment of the present disclosure, the motor has a cable extending from a second end, and the closed end is provided with a cable through hole, from which the cable can protrude.

As a further improvement of an embodiment of the present disclosure, the open end is provided with a cable fixing portion configured as a through hole through which a cable protruding from the cable through hole is inserted.

As a further improvement of the embodiment of the present disclosure, the second end of the motor has a plurality of first exhaust holes extending in the circumferential direction, the waterproof jacket is provided with at least one second exhaust hole corresponding to at least one position of the plurality of first exhaust holes, and the at least one second exhaust hole is located at the lower portion of the motor.

As a further improvement of the embodiment of the present disclosure, the second end of the motor has a plurality of first exhaust holes extending in the circumferential direction, the waterproof jacket is provided with a second exhaust hole offset from the plurality of first exhaust holes in the circumferential direction, an exhaust passage is arranged between the waterproof jacket and the housing of the motor, and the exhaust passage fluidly connects the plurality of first exhaust holes and the second exhaust hole.

As a further improvement of the embodiment of the present disclosure, the second exhaust holes are located at the lower portion of the motor, the number of the first exhaust holes is three, and the three first exhaust holes are located above and on two sides of the motor respectively.

As a further improvement of the embodiment of the present disclosure, at least the open end of the waterproof jacket is made of an elastic material, and the open end is sleeved outside the motor mounting portion through elastic deformation.

As a further improvement of the embodiment of the present disclosure, the waterproof jacket is provided with a shoulder portion between the open end and the closed end, the inner diameter from the shoulder portion to the open end is larger than the inner diameter from the shoulder portion to the closed end, the waterproof jacket is connected with the motor mounting portion, and the shoulder portion can abut against the motor mounting portion.

The disclosure further provides a safe and reliable electrically started gasoline engine, which comprises a body, a cylinder arranged in the body, a piston reciprocating in the cylinder, a crankshaft linked with the piston, a motor for driving the crankshaft to rotate during starting, and the electrically started gasoline engine further comprises the above waterproof motor structure.

Compared with the prior art, the disclosed subject matter has the advantages that: in case of the waterproof motor structure according to present disclosure, the waterproof jacket is sleeved on the motor, the motor can be sealed by the waterproof jacket and the motor mounting portion, so that external water is prevented from entering the motor, and the exhaust holes are reserved on the waterproof jacket, the mounting positions of the exhaust holes are reasonably arranged, therefore water which enters accidentally can be discharged, and meanwhile, the exhaust of the motor is not affected, so that short circuit and damage of parts after the motor enters water are avoided, and potential safety hazards during use of the motor are eliminated.

DETAILED DESCRIPTION

The invention will be described in detail below with reference to specific embodiments shown in the accompanying drawings. However, these embodiments are not intended to limit the present invention, and structural, methodological, or functional changes made by those skilled in the art on the basis of these embodiments are intended to be included within the scope of the present invention.

Figure 1:
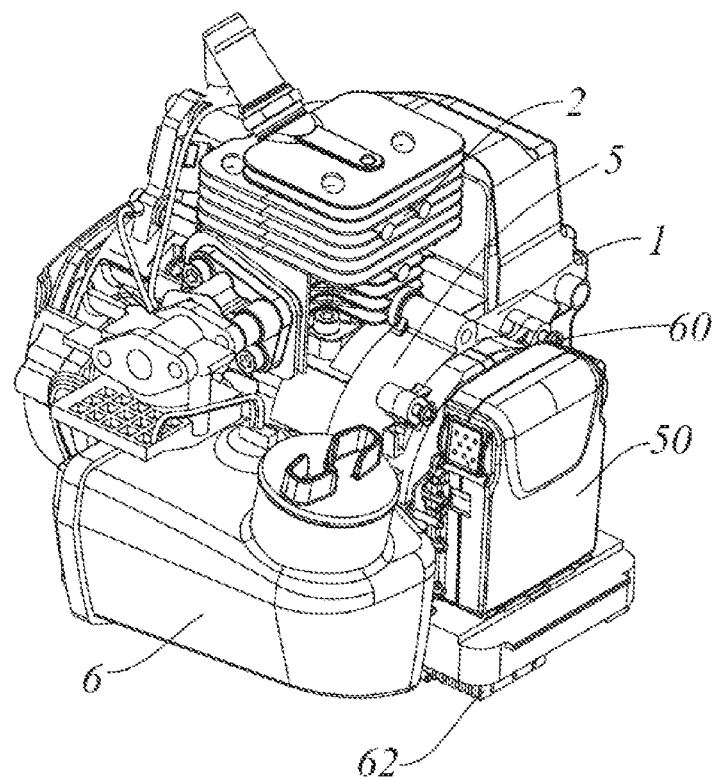
FIG. 1 is a stereoscopic diagram of an electrically started gasoline engine in accordance with a preferred embodiment of the present disclosure.
Figure 2:
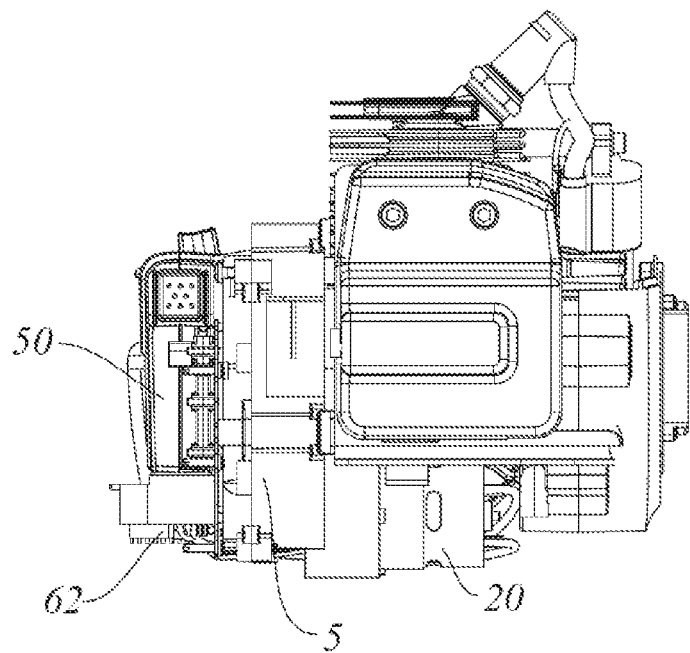
FIG. 2 is a rear view of the electrically started gasoline engine of FIG. 1.
Figure 3:
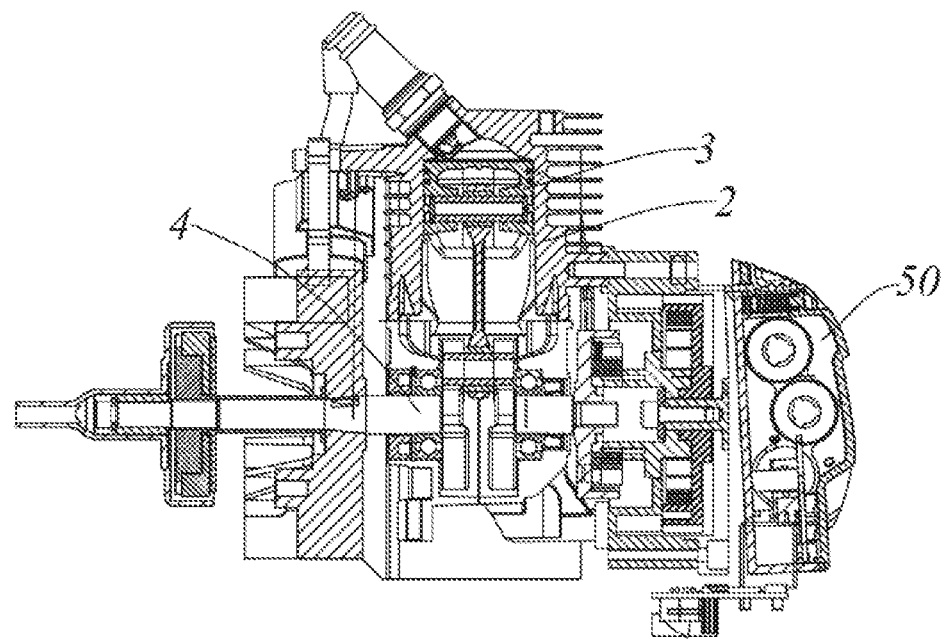
FIG. 3 is a schematic cross-sectional view of the electrically started gasoline engine of FIG. 1.
Figure 4:
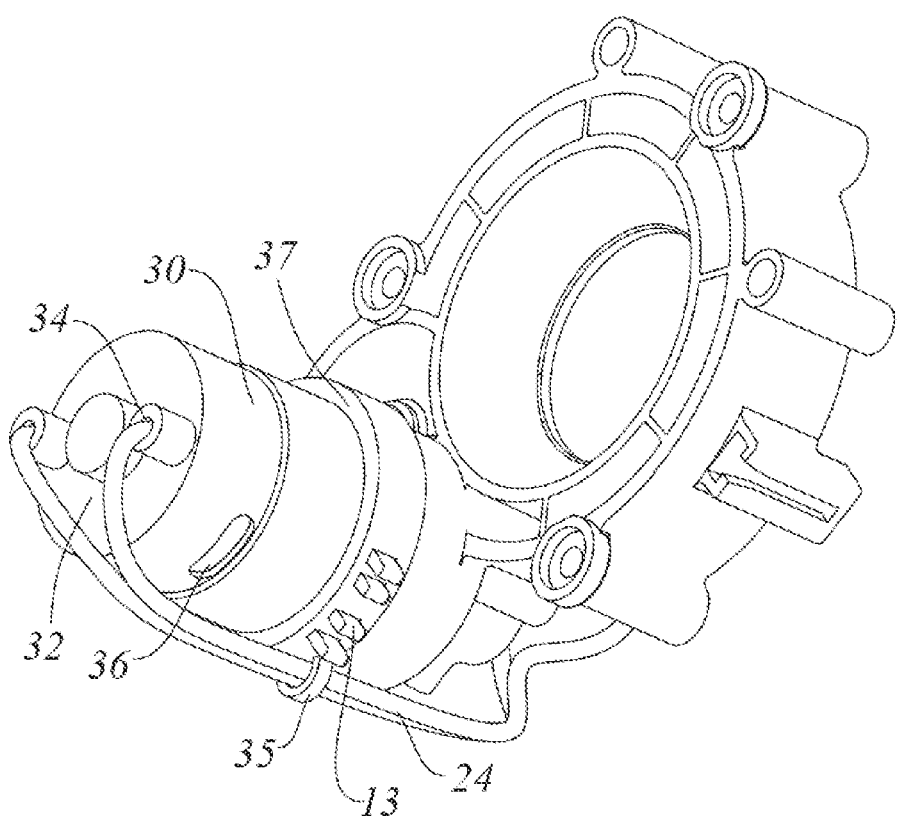
FIG. 4 is a stereoscopic diagram of a waterproof motor structure of the electrically started gasoline engine of FIG. 1.
Figure 5:
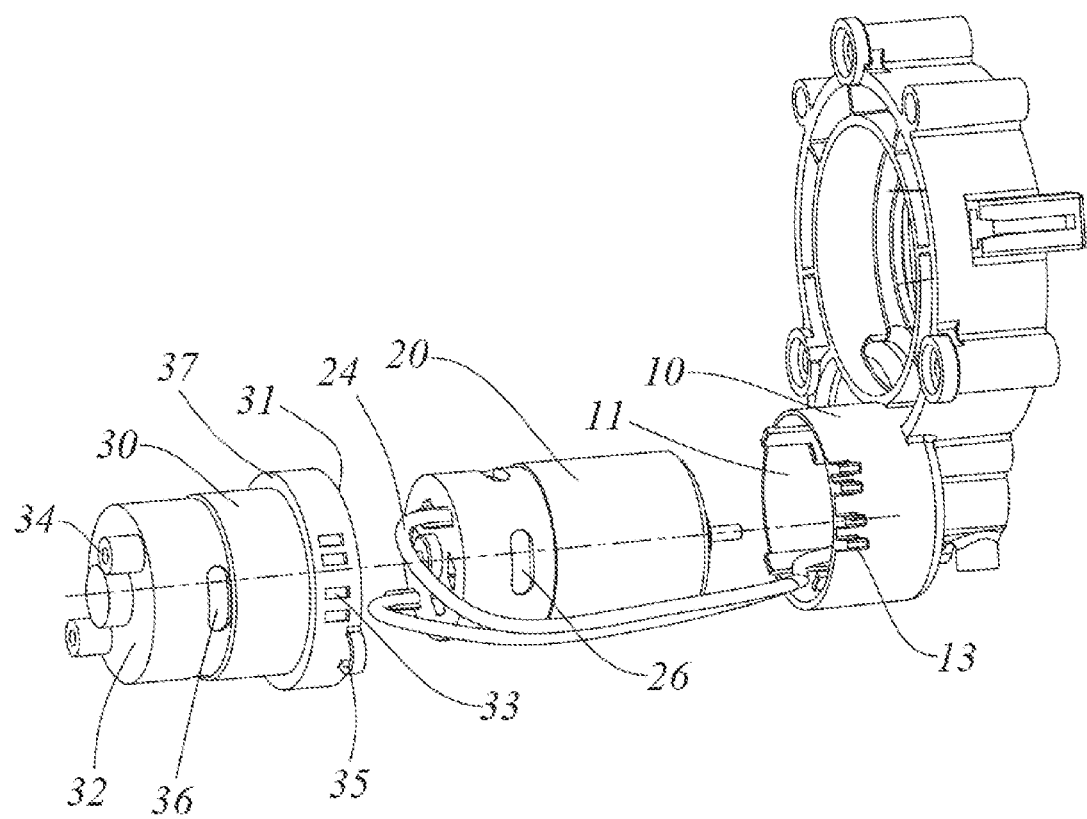
FIG. 5 is an exploded diagram of the waterproof motor structure of FIG. 4.
Figure 6:
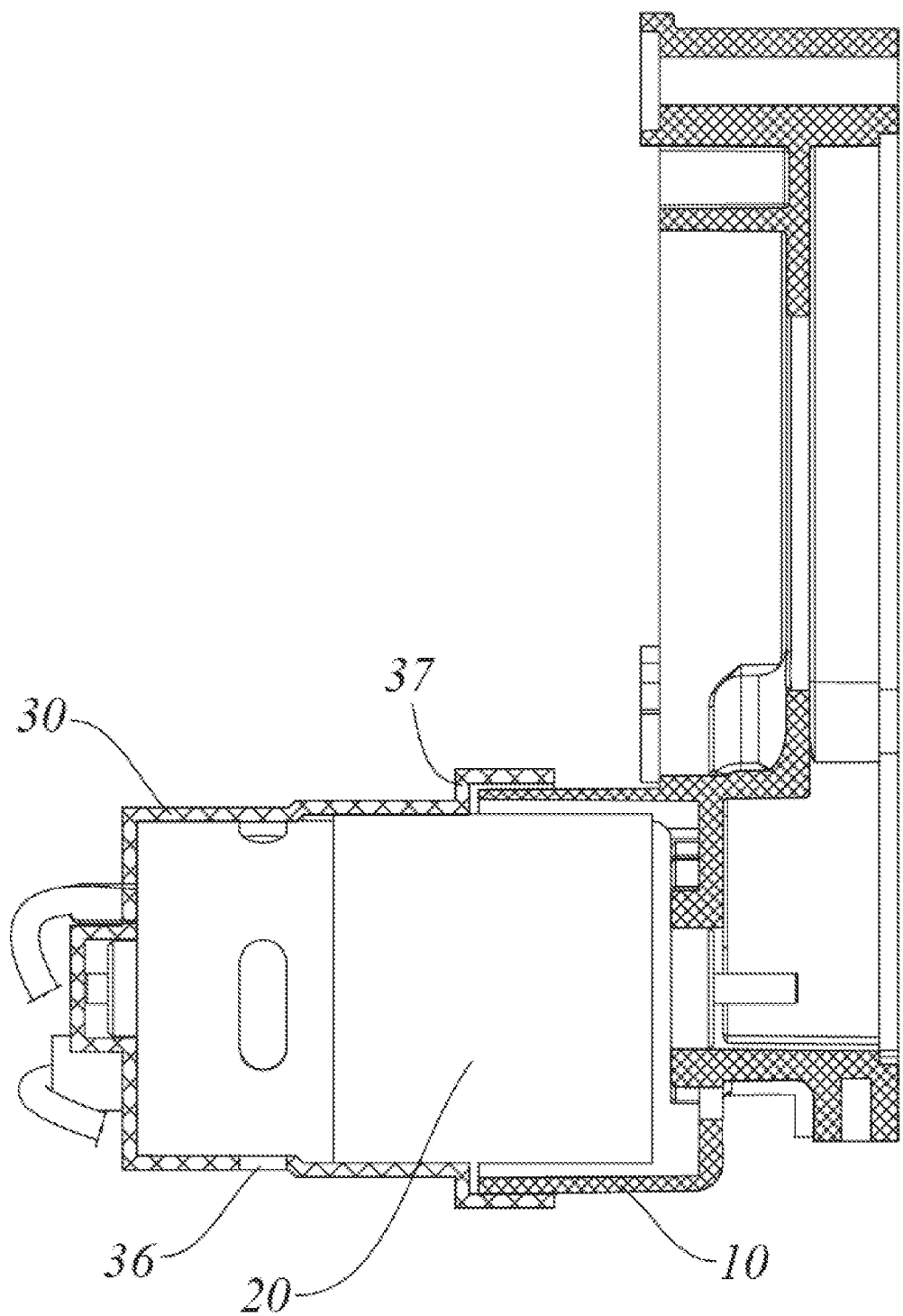
FIG. 6 is a schematic cross-sectional view of the waterproof motor structure of FIG. 4.
Figure 7:
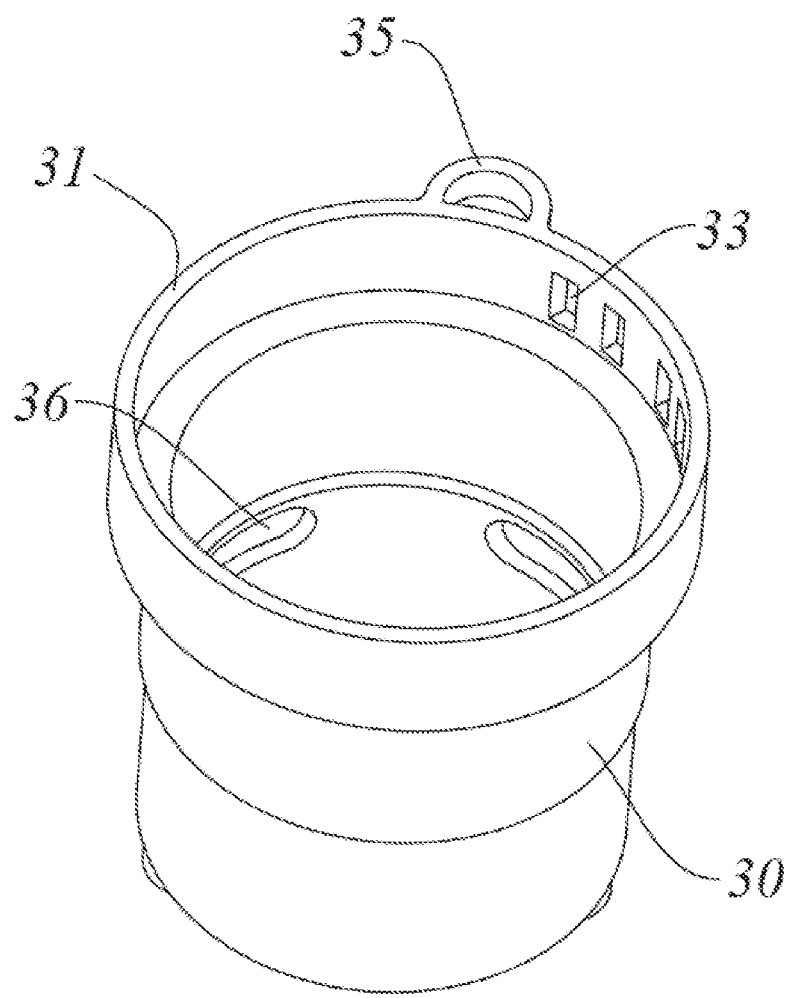
FIG. 7 is a stereoscopic diagram of a waterproof jacket of the waterproof motor structure of FIG. 4.

As shown in FIGS. 1 to 3, the preferred electrically started gasoline engine of the present disclosure comprises a body 1, a cylinder 2 mounted on the body 1, a piston 3 reciprocating in the cylinder 2, a crankshaft 4 linked with the piston 3, a speed reducing unit 5 driving the crankshaft 4 to rotate when starting, and a motor 20 driving the speed reducing unit 5 to work, wherein the motor 20 is arranged at the bottom of the body 1, the speed reducing unit 5 is preferably a gear speed reduction mechanism, and the motor 20 drives the crankshaft 4 to rotate through the gear speed reduction mechanism to realize the electric start process of the gasoline engine. The cylinder 2 is located on the upper portion of the body 1, the piston 3 is arranged in the cylinder 2, when the gasoline engine is started, the oil-gas mixture in the cylinder 2 is combusted, and the piston 3 is pushed to reciprocate, so that the gasoline engine is in a working state. The structural composition and the working principle of the electrically started gasoline engine are known by those skilled in the art and will not be described herein again, and in addition, the electrically started gasoline engine also comprises a battery assembly for supplying power to the motor, wherein the battery assembly is arranged at one side of the body. The battery assembly includes a DC power source, which is preferably a removable rechargeable battery pack.

When the electrically started gasoline engine works outdoors in rainy days or is placed outdoors, if water enters the motor part, the battery pack and the connecting part of the battery pack and the body, the normal use of the electrically started gasoline engine may be affected, and even potential safety hazards are brought, therefore the electrically started gasoline engine according to the present disclosure further comprises a waterproof motor structure and a battery assembly waterproof structure. As will be described in detail below.

As shown in FIGS. 4 to 7, 8 and 9, a preferred waterproof motor structure of the electrically started gasoline engine of the present disclosure includes a motor mounting portion 10, which is formed by a motor bracket disposed inside the electrically started gasoline engine and is connected to the crankshaft of the gasoline engine through a speed reducing unit. The motor mounting portion 10 has a motor accommodating cavity 11, wherein the motor 20 has a first end for outputting torque and an opposite second end, and the first end is at least partially mounted in the motor accommodating cavity 11. In the present embodiment, the speed reducing unit 5 is provided on the motor bracket, and the speed reducing unit 5 and the first end of the motor 20 (i.e., the output shaft of the motor 20) are connected inside the motor bracket. The waterproof motor structure further comprises a waterproof jacket 30 sleeved on the second end, the waterproof jacket 30 is provided with a closed end 32 and an open end 31, the second end of the motor 20 penetrates through the open end 31 of the waterproof jacket 30, the open end 31 of the waterproof jacket 30 is sleeved with the motor mounting portion 10 so as to seal the motor 20 in the inner space of the motor accommodating cavity 11 and the waterproof jacket 30, and the sleeved connection of the open end 31 and the motor mounting portion 10 can also be considered that the open end 31 and the motor mounting portion 10 are connected, and both of them are at least partially overlapped along the axial direction of the motor. In the present embodiment, the waterproof jacket 30 and the motor accommodating cavity 11 are both configured to be cylindrical, wherein at least the open end 31 of the waterproof jacket 30 is made of an elastic material, and the open end 31 is sleeved outside the motor mounting portion 10 through elastic deformation. Preferably, the waterproof jacket 30 is entirely made of the elastic material, and the expanded open end 31 thereof is sleeved on the outer circumference of the motor mounting portion 10, and the motor mounting portion 10 is tightened under the elastic force of the waterproof jacket 30 itself to enhance the sealing effect. Of course, it is also possible that the outer diameter of the open end 31 is smaller than the inner diameter of the motor accommodating cavity 11, and the open end is inserted into the motor accommodating cavity. In addition, a shoulder portion 37 is provided between the open end 31 and the closed end 32, the inner diameter of the part from the shoulder portion 37 to the open end 31 is larger than that of the part from the shoulder portion 37 to the closed end 32, so that when the waterproof jacket 30 and the motor mounting portion 10 are mounted, the shoulder portion 37 can limit the mounting of the waterproof jacket 30 and the motor mounting portion 10, and the waterproof jacket 30 can be closer to the motor 20, thereby saving space.

In the present embodiment, it is preferable that a plurality of positioning protrusions 13 are provided on the outer edge of the motor mounting portion 10, a plurality of positioning grooves 33 corresponding to the plurality of positioning protrusions 13 are provided on the outer edge of the open end 31 of the corresponding waterproof jacket 30, and the plurality of positioning protrusions 13 are cooperatively connected with the plurality of positioning grooves 33 so that the waterproof jacket 30 is fixed with respect to the motor mounting portion 10. Wherein, the plurality of positioning grooves 33 may penetrate through the outer edge of the open end 31, so that the open end 31 may be corresponding to the positioning protrusions 13 through the positioning grooves 33 to be directly sleeved on the motor mounting portion 10. Of course, the plurality of positioning grooves 33 may be disposed not to penetrate the outer edge of the open end 31, that is, the plurality of positioning grooves 33 are disposed at intervals with respect to the edge of the open end 31. The waterproof jacket 30 may be configured to be made of an elastic material, so that the connection of the positioning grooves and the positioning protrusions may be realized by elastic deformation. The connection mode of the open end of the waterproof jacket and the motor mounting portion can also be interference fit, threaded connection, glue joint and the like.

Figure 8:
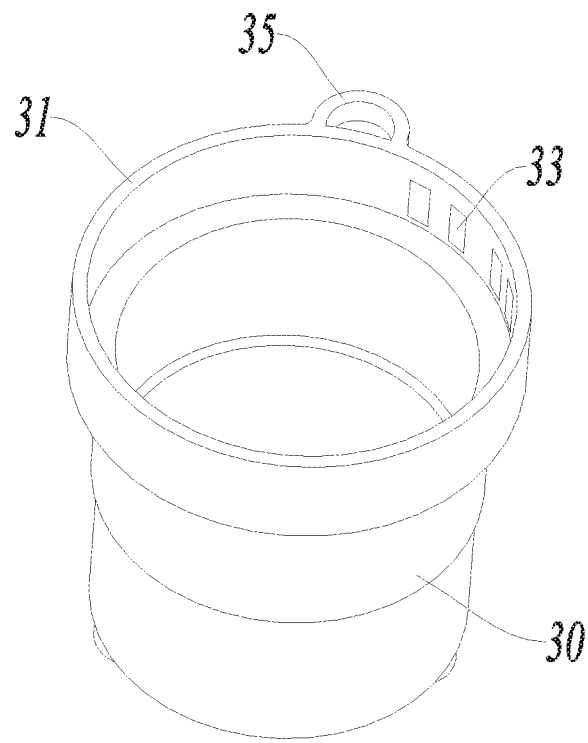
FIG. 8 is a stereoscopic diagram of another embodiment of the waterproof jacket of the waterproof motor structure.
Figure 9:
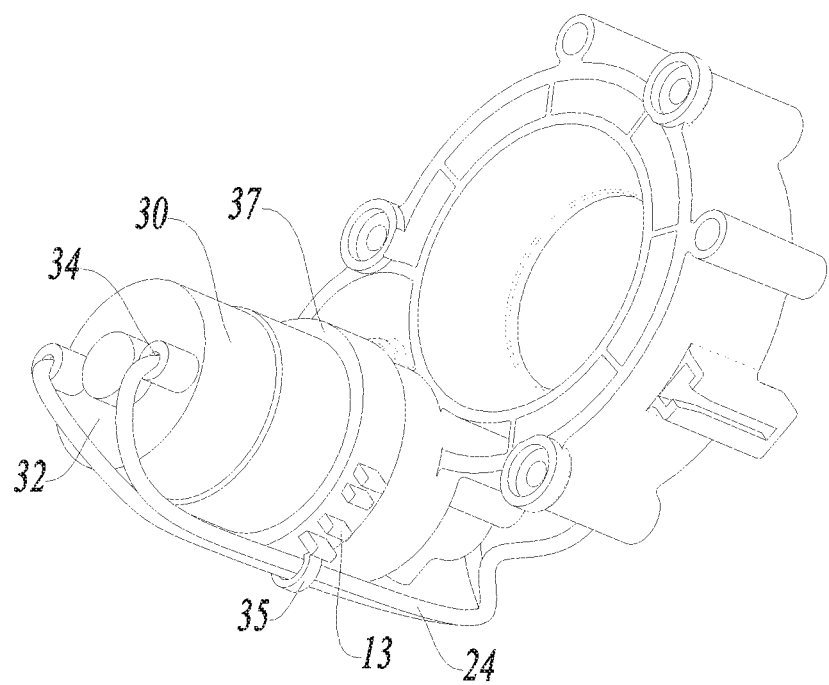
FIG. 9 is a stereoscopic diagram of another embodiment of the waterproof motor structure.

In one embodiment, as shown in FIGS. 4 to 7, the positioning groove 33 is a through hole. In another embodiment, as shown in FIGS. 8 to 9, the positioning groove 33 is a blind hole, so as to more effectively prevent external water from entering the inside of the waterproof jacket 30.

The motor 20 has a cable 24 extending from the second end, and the closed end 32 of the waterproof jacket 30 is provided with a cable through hole 34 from which the cable 24 can extend out, so that the gap between the waterproof jacket 30 and the motor 20 is smaller and more space-saving. In addition, in one embodiment, as shown in FIGS. 4 to 7, a plurality of first exhaust holes 26 are provided on the housing 201 of the motor 20 near the second end and distributed along the circumferential direction, each of the first exhaust holes 26 extends along the circumferential direction, and correspondingly, at least one second exhaust hole 36 is disposed on the waterproof jacket 30 and the position thereof corresponds to that of at least one first exhaust hole 26, preferably, the second exhaust hole 36 and the positioning groove 33 are disposed on the same side of the waterproof jacket 30, where the same side refers to simultaneously viewing the second exhaust hole 36 and the positioning groove 33 in the same direction. In this way, when the waterproof jacket 30 is mounted on the motor mounting portion 10, the side provided with the second exhaust hole 36 and the positioning groove 33 is mounted downward, which means the direction toward the ground when the tool for mounting the motor 20 is used normally, so that water leakage from the second exhaust hole 36 and the gap between the positioning groove 33 and the positioning protrusion 13 during use, or water which has been inadvertently introduced can be discharged without affecting the exhaust of the motor 20. Of course, in another embodiment, as shown in FIGS. 8 to 9, the waterproof jacket 30 may not be provided with the second exhaust hole, and since the operating time of the starter motor is short and the generated heat does not adversely affect the waterproof jacket, the waterproof jacket is not provided with the exhaust hole, and the starter motor does not exhaust air, so that the waterproof effect can be enhanced. Meanwhile, due to the iris action of the waterproof jacket, sparks generated when the motor works are limited in the waterproof jacket and isolated from the gasoline engine, thereby ensuring the use safety of the gasoline engine.

Figure 10:
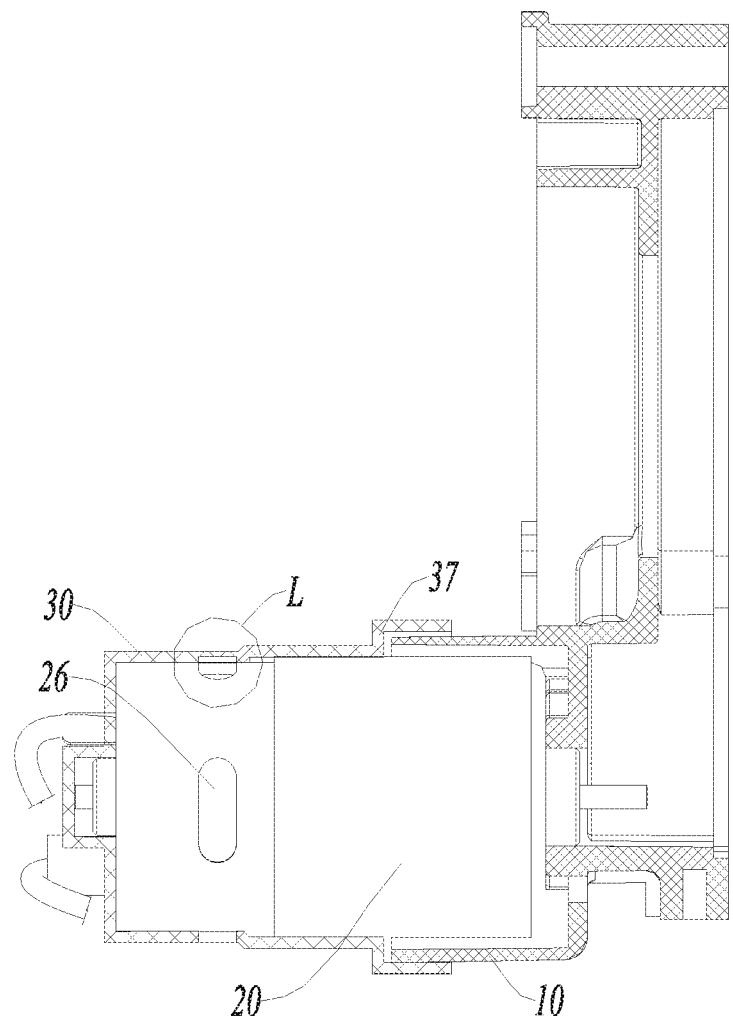
FIG. 10 is a cross-sectional diagram of still another embodiment of the waterproof motor structure.
Figure 11:
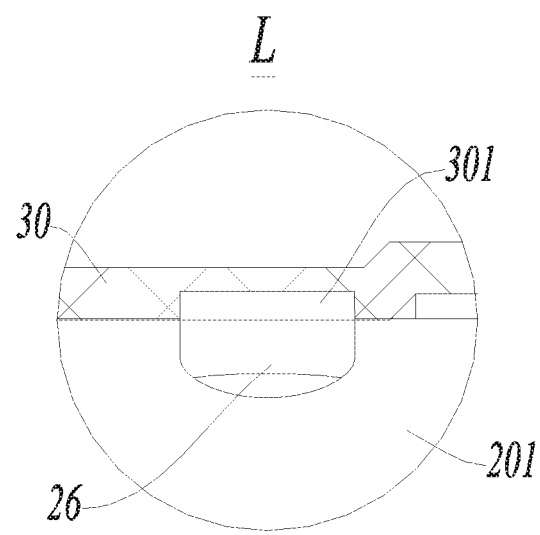
FIG. 11 is an enlarged view of portion L in FIG. 20.
Figure 12:
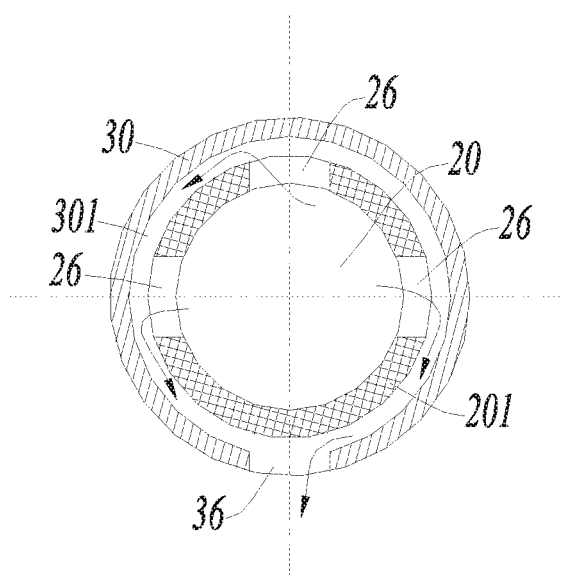
FIG. 12 is a schematic cross-sectional view of still another embodiment of the waterproof motor structure.
Figure 13:
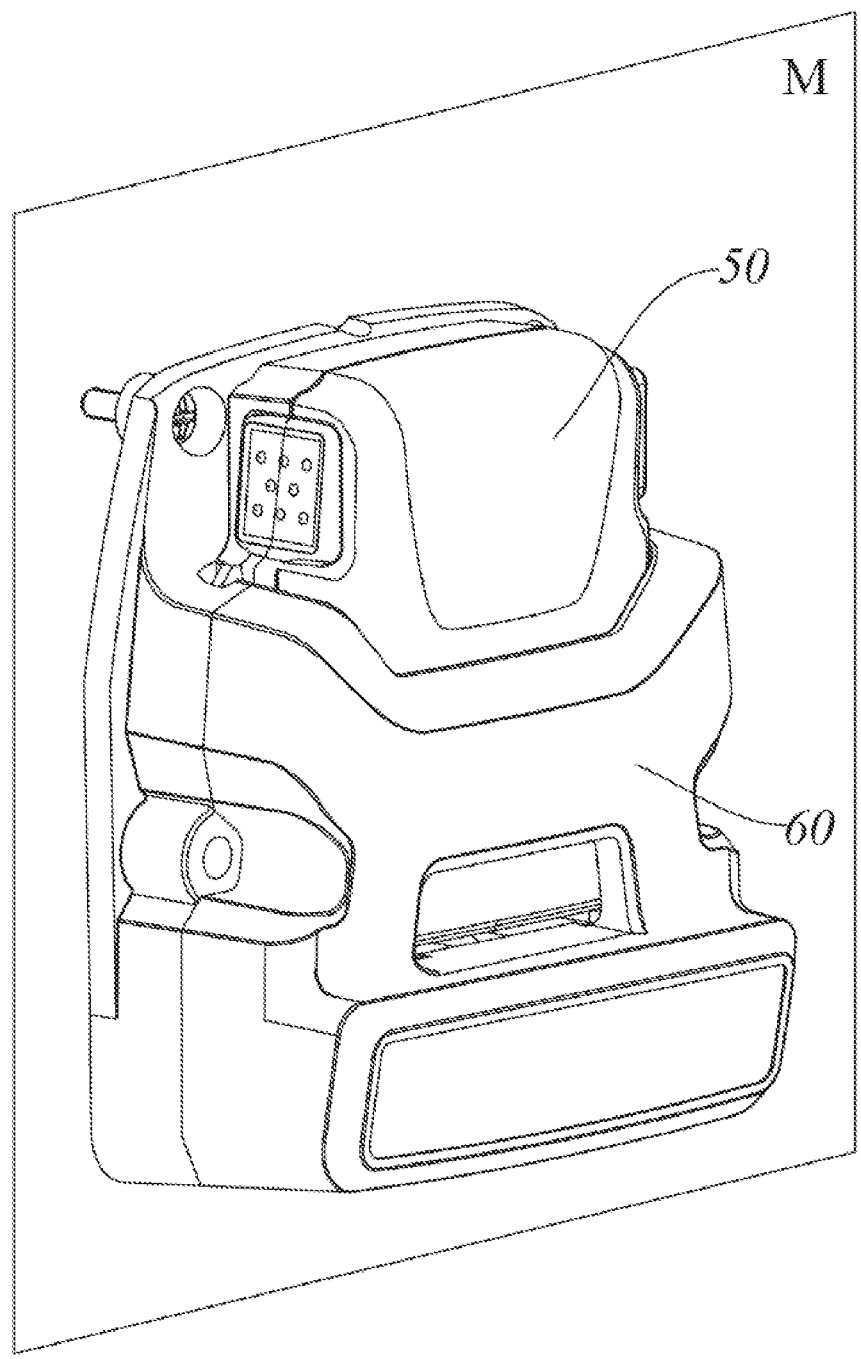
FIG. 13 is a stereoscopic diagram of the battery assembly of the electrically started gasoline engine of FIG. 1.
Figure 14:
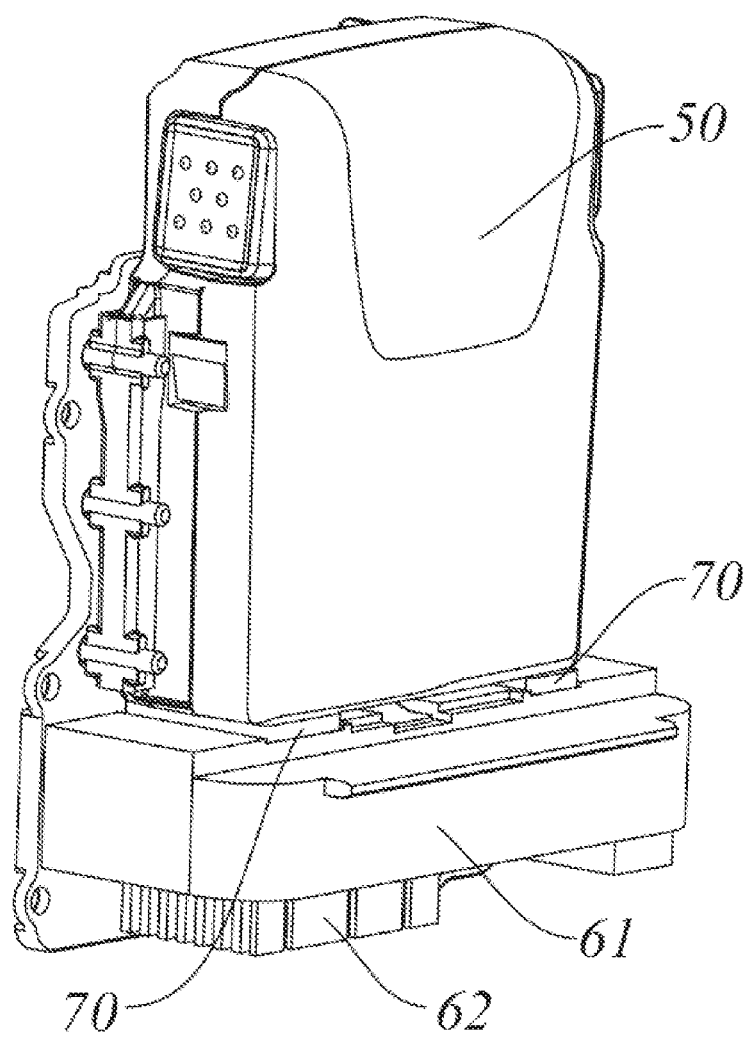
FIG. 14 is a schematic diagram of the battery assembly of FIG. 13 with the cavity accommodating the battery pack removed.
Figure 15:
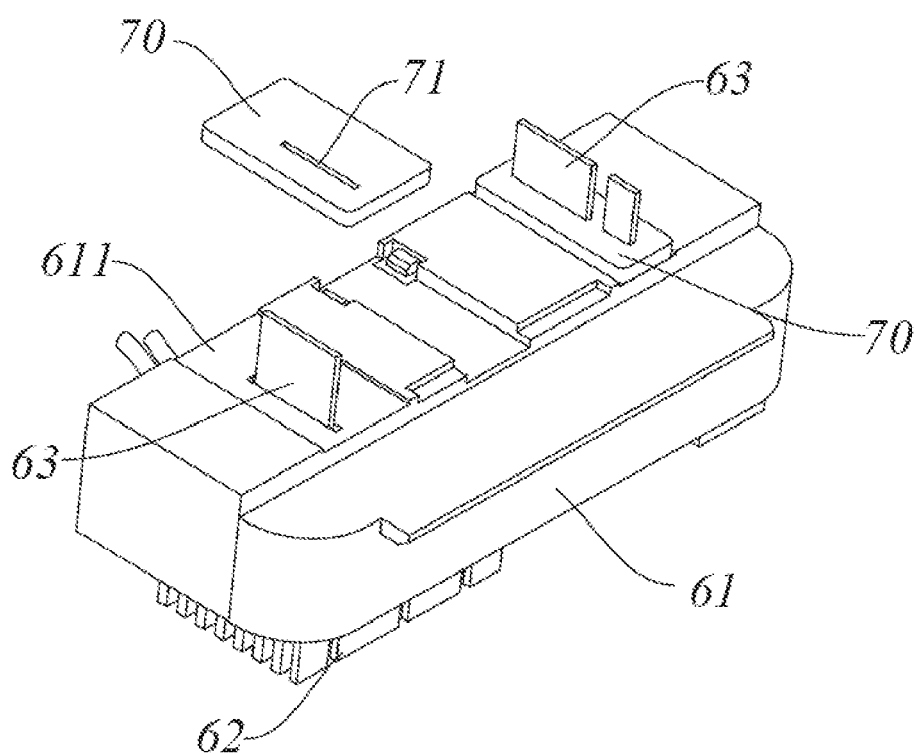
FIG. 15 is a stereoscopic diagram of a base of a battery pack seat of the battery pack of FIG. 13.
Figure 16:
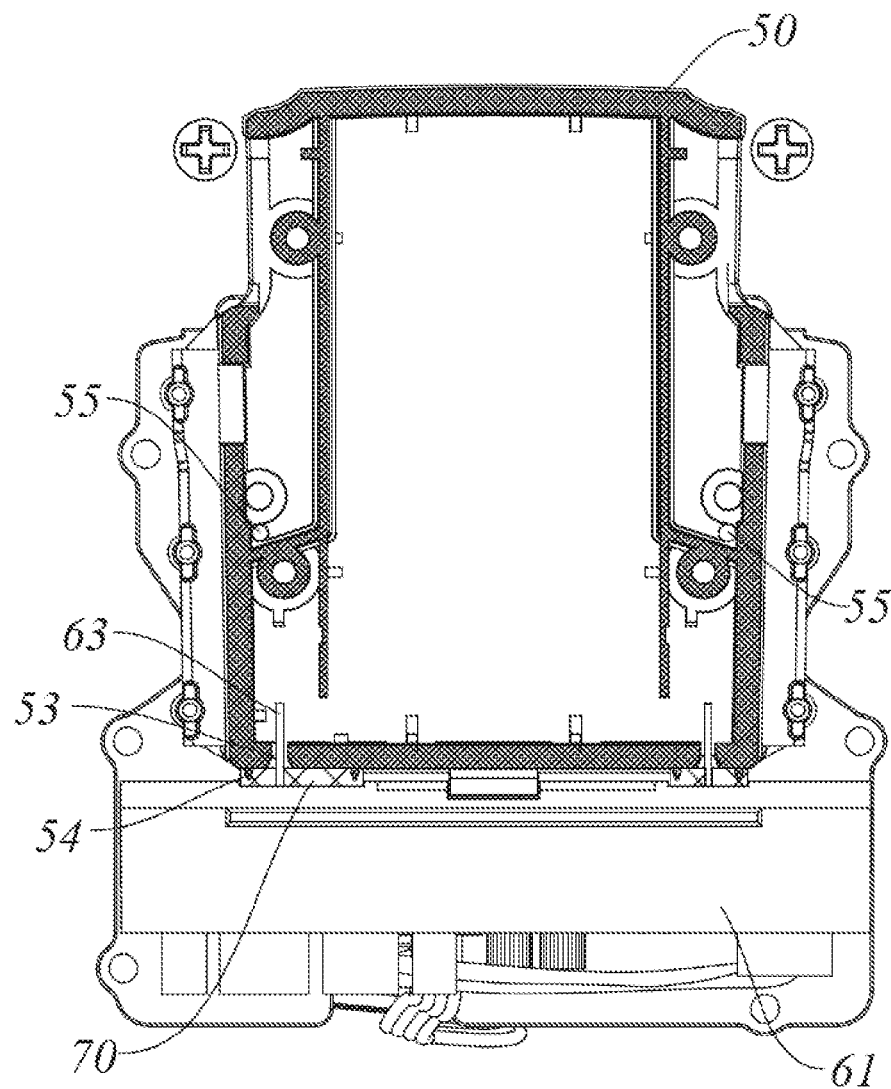
FIG. 16 is a schematic cross-sectional view of plane M of the battery assembly in FIG. 13.
Figure 17:
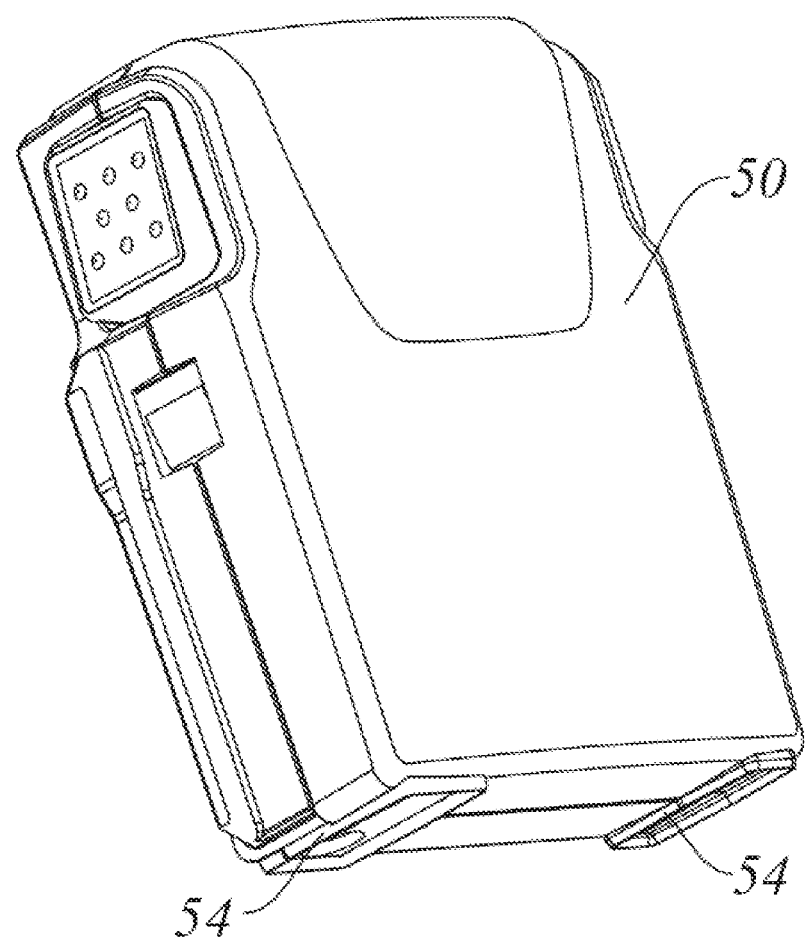
FIG. 17 is a stereoscopic diagram of a battery pack of the battery assembly in FIG. 13.
Figure 18:
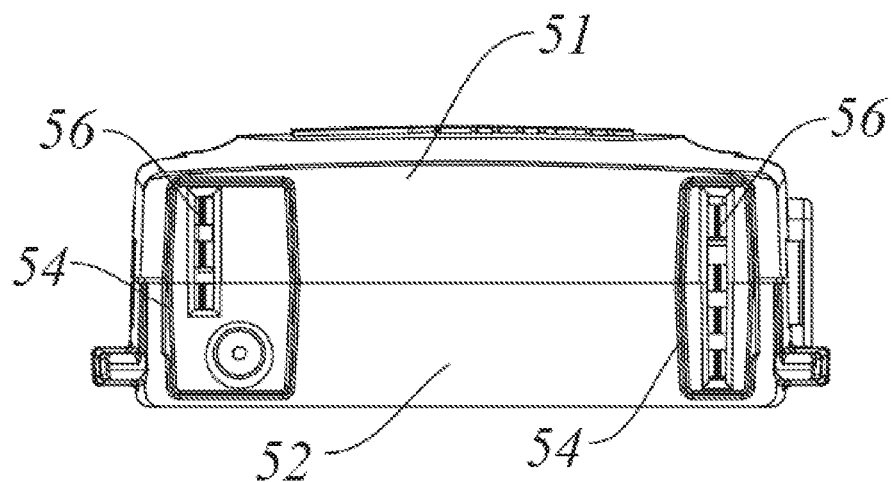
FIG. 18 is a schematic upward view of the battery pack in FIG. 17.
Figure 19:
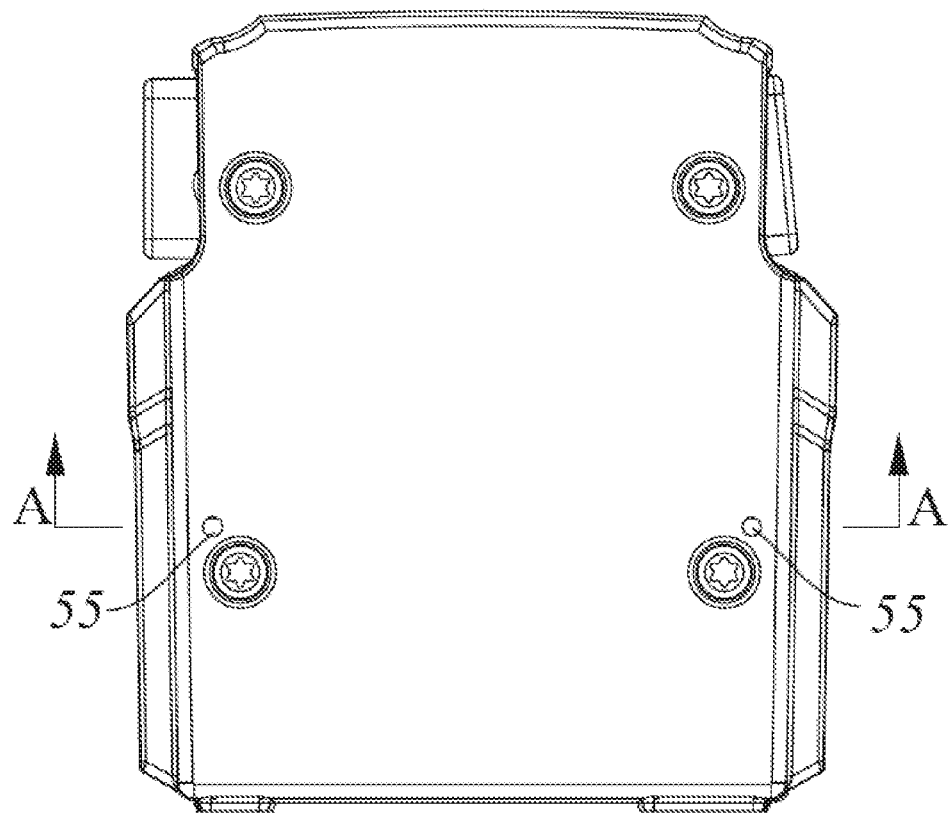
FIG. 19 is a schematic rear view of the battery pack in FIG. 17.
Figure 20:
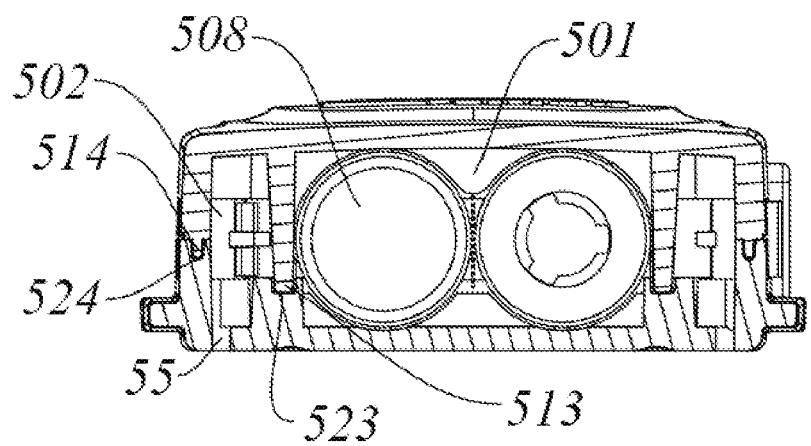
FIG. 20 is a schematic cross-sectional view taken along line A-A in FIG. 17.
Figure 21:
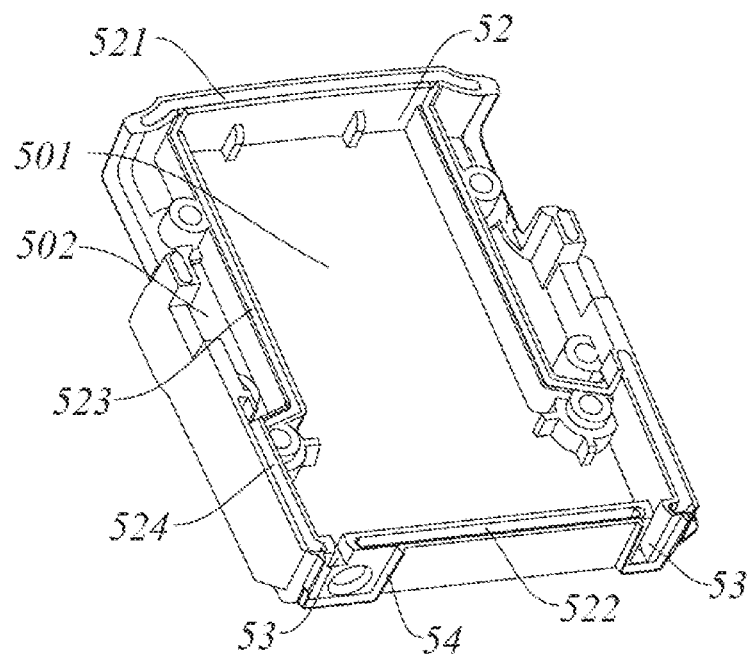
FIG. 21 is a stereoscopic diagram of the rear cover of the battery pack in FIG. 17.
Figure 22:
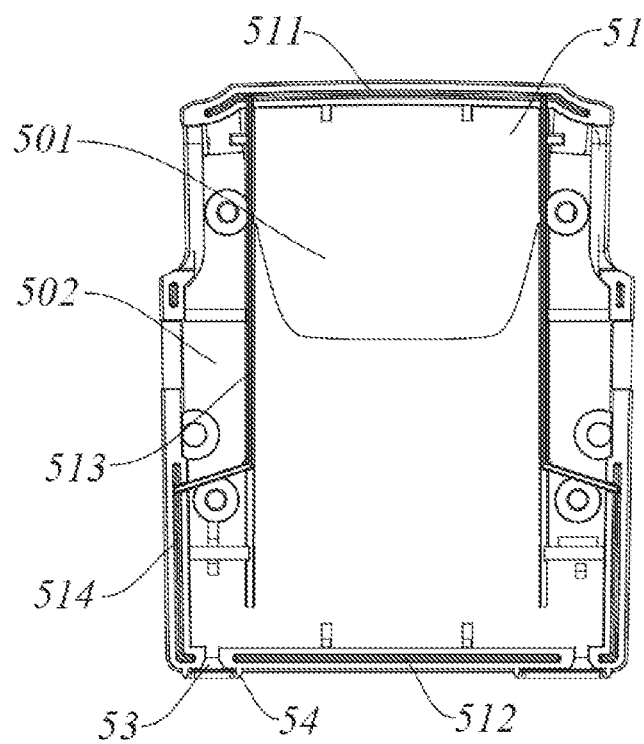
FIG. 22 is a schematic plan view of the front cover of the battery pack in FIG. 17.

In still another embodiment, as shown in FIGS. 10 to 12, it should be noted that FIG. 12 is a schematic cross-sectional view of the present embodiment, which is merely used to schematically show the assembly relationship between the waterproof jacket 30 and the motor 20, and is not drawn in strict according to the proportion of each component in FIG. 10, and other components are not shown. The waterproof jacket 30 is provided with at least one second exhaust hole 36, and the motor housing 201 is provided with a plurality of first exhaust holes 26. Neither of the first exhaust holes 26 directly corresponds to any of the second exhaust holes 36. An exhaust passage 301 is provided between the waterproof jacket 30 and the motor housing 201, and the exhaust passage 301 fluidly communicates the first exhaust hole 26 with the second exhaust hole 36. That is, the gas firstly enters the exhaust passage 301 from the inside of the motor 20 through the first exhaust hole 26, moves in the exhaust passage 301 for a certain distance approximately along the circumferential direction and/or the axial direction of the motor 20, and then is exhausted through the second exhaust hole 36 approximately along the radial direction of the motor 20. The arrowed curves in FIG. 12 schematically show the flow direction of the gas flow. Since the motor 20 is used on the gasoline engine and is close to the oil tank and the cylinder, the design of the above-mentioned zigzag exhaust can not only prevent water from directly entering the motor under the condition of ensuring ventilation, but also effectively prevent sparks generated when the motor works from directly spraying out of the motor housing 201, thereby ensuring the use safety of the gasoline engine. Specifically, in the present embodiment, as shown in FIG. 12, the waterproof jacket 30 is provided with one second exhaust hole 36, and the second exhaust hole 36 is located below (i.e., in the six o'clock direction in FIG. 12). The motor housing 201 is provided with three first exhaust holes 26 respectively located at the upper and both sides (i.e., the three o'clock, nine o'clock, and twelve o'clock directions in FIG. 12). A vent groove, specifically, a ring-shaped vent groove, is provided on the inner wall of the waterproof jacket 30 along the circumferential direction thereof, and the vent groove and the motor housing 201 cooperate to form the exhaust passage 301. Of course, in other embodiments, the vent groove may also be provided on the motor housing 201, or both the inner wall of the waterproof jacket 30 and the motor housing 201 may be provided with a vent groove. When the electrically started gasoline engine is normally stored or works, the second exhaust port is positioned below the machine. The gas discharged from the motor 20 is discharged through the exhaust passage 301, and the waterproof jacket 30 also serves to block the spark of the motor.

Further, after the cable 24 is extended from the cable through hole 34, in order to enable the cables 24 to be placed in order, a cable fixing portion 35 is provided on the outer circumferential surface of the open end 31 of the waterproof jacket, and the cable fixing portion 35 is configured as a through hole through which the cable 24 extended from the cable through hole 34 are inserted, so that the displacement of the cables can be prevented.

Referring to FIGS. 13 to 22, there is shown a waterproof structure of a preferred battery assembly for an electrically started gasoline engine according to the present disclosure. The battery assembly includes a battery pack 50 and a battery pack seat 60 for mounting the battery pack 50, the battery pack seat 60 having a cavity for accommodating the battery pack 50 and a base 61 for achieving electrical connection with the battery pack, the battery pack 50 including a housing and a battery core 508 provided in the housing. The base portion 61 is provided with a sealing member 70 and a first terminal 63, the first terminal 63 extends out of the sealing member 70, the battery pack 50 is provided with a socket 53 matched with the first terminal 70, the battery pack 50 is electrically connected with the first terminal 63 through the socket 53, and the sealing member 70 can be attached to the under surface of the battery pack 50 provided with the socket 53. The socket 53 is formed in the bottom of the battery pack housing corresponding to the position of the first terminal 63, and the first terminal 63 passes through the socket 53 to be electrically connected with the second terminal 56 formed on the battery pack 50 when the battery pack 50 is mounted on the base 61.

Generally, the first terminal 63 refers to a male terminal, which is configured as a male tab in the present embodiment, and the second terminal 56 is a female terminal, which is configured as an integral part of the socket in the present embodiment. Of course, it is also possible that the first terminal is a female terminal and the second terminal is a male terminal, as long as the electrical connection between the battery pack and the base portion can be achieved. A control panel 62 is provided below the base 61, a sealing member mounting groove 611 is provided on the upper surface, which is matched with the battery pack 50, of the base 61, a through hole penetrating through the base is arranged in the sealing member mounting groove 611, at least one first terminal 63 passes through the through hole, the lower end of the first terminal 63 is electrically connected with the control panel 62, and the upper end of the first terminal 63 is electrically connected with the battery pack 50. The sealing member 70 is disposed in the sealing member mounting groove 611, and the sealing member 70 is provided with a terminal groove 71 through which the first terminal 63 passes. The sealing member 70 can seal the sealing member mounting groove 611 and the socket 53, and prevent external water from entering the battery core 508 from the socket 53 or entering the control plate 62 from the through hole in the sealing member mounting groove 611. Preferably, the thickness of the sealing member 70 is slightly larger than the depth of the sealing member mounting groove 611. In the present embodiment, the sealing member 70 is formed of a rubber sheet, and may also be formed of other elastic seal materials. Because the sealing member 70 has elasticity, hard contact between the battery pack 50 and the battery pack seat 60 can be avoided and material loss caused by collision or friction between the battery pack 50 and the battery pack seat 60 during operation of the gasoline engine can be reduced.

The bottom of the housing of the battery pack 50 is further provided with a protrusion portion 54 annularly disposed around the socket 53 and having a tip end, wherein the protrusion portion 54 annularly surrounds an area smaller than that of the sealing member 70. Here, the annular surrounding means that the protrusion portion 54 is disposed around one circumference of the socket 53, and is not limited to the surrounding shape, which may be a circular shape, a square shape, or other shapes. When the battery pack 50 is mounted on the base 61 of the battery pack seat 60, the protrusion portion 54 presses the sealing member 70. Likewise, a second protrusion portion annularly surrounding the first terminal and having a smaller surrounding area than the sealing member may be provided in the sealing member mounting groove 611, and has a tip end, thereby further enhancing the sealing effect. In addition, it is also possible that the battery pack is provided with a sealing member mounting groove, the base 61 is provided with a protrusion portion, and the protrusion portion may be annularly provided around the male tab or the socket. The provision of the protrusion portion 54 can reduce the locking force required to achieve sealing between the battery pack and the base 61, thereby enhancing the sealing effect.

In the present embodiment, the housing of the battery pack 50 is composed of a front cover 51 and a rear cover 52. The housing is provided with an inner cavity 501 for accommodating the battery core, the battery core 508 is arranged in the inner cavity 501, the front cover 51 comprises a first surrounding wall which surrounds a part of the inner cavity, the rear cover 52 comprises a second surrounding wall which surrounds another part of the inner cavity, the front cover 51 further comprises a first outer wall which is positioned on the outer side of the part of the first surrounding wall, the rear cover 52 further comprises a second outer wall which is positioned on the outer side of the part of the second surrounding wall, a groove portion is arranged on one of the first surrounding wall and the second surrounding wall, a protrusion portion is arranged on the other of the first surrounding wall and the second surrounding wall, the front cover 51 and the rear cover 52 are inserted into the groove portion through the protrusion portion to form the inner cavity 501 and an outer cavity 502 which is independent relative to the inner cavity 501, the outer cavity is enclosed by the first outer wall, the second outer wall, a part of the first surrounding wall and a part of the second surrounding wall, the rear cover 52 is provided with a drain hole 55 which is communicated with the outer cavity 502. The groove portion and the protrusion portion are matched to form a seal, so that external water is prevented from entering the inner cavity 501 to short circuit the battery core 508.

The configurations of and the engagement between the groove portion and the protrusion portion will be described in detail below. The slot portion include a first slot portion 521, a second slot portion 522, a third slot portion 523 and a fourth slot portion 524, the first slot portion 521 and the second slot portion 522 are respectively arranged on the upper side wall and the lower side wall of the second surrounding wall of the rear cover 52, the left side wall of the rear cover 52 is provided with the third slot portion 523 and the fourth slot portion 524 which are communicated with each other, wherein the third slot portion 523 is closer to the center of the inner cavity 501 relative to the fourth slot portion 524, the right side wall of the rear cover 52 is approximately symmetrical with the left side wall thereof and is also provided with the third slot portion and the fourth slot portion, wherein the fourth slot portion 524 and the second slot portion 522 are disconnected at the socket 53, so that the first slot portion 521, the second slot portion 522, the third slot portion 523 and the fourth slot portion 524 are enclosed to form the inner cavity 501. Likewise, the protrusion portion includes a first protrusion portion 511, a second protrusion portion 512, a third protrusion portion 513 and a fourth protrusion portion 514, the first protrusion portion 511 and the second protrusion portion 512 are respectively disposed on the upper side wall and the lower side wall of the second surrounding wall of the front cover 51, the left side wall of the front cover 51 is provided with the third protrusion portion 513 and the fourth protrusion portion 514 which are communicated with each other, wherein the third protrusion portion 513 is closer to the center of the inner cavity 501 relative to the fourth protrusion portion 514, the right side wall of the front cover 51 is approximately symmetrical with the left side wall thereof and is provided with the third protrusion portion and the fourth protrusion portion, wherein the fourth protrusion portion 514 and the second protrusion portion 512 are disconnected at the socket 53.

It can be seen from the above that the inside of the battery pack 50 is sealed into two independent spaces by the matching of the groove portion and the protrusion portion, and the drain hole 55 is disposed in the outer cavity 502, so that the path of water entering the inner cavity 501 is blocked, and the potential safety hazard of water entering the battery core 508 is eliminated. Further, the drainage area of the drain hole is not smaller than the area of a circular hole with a diameter of 6 mm. Furthermore, the drain hole may be a round hole, a square hole, or any other shape. In other embodiments, a sealing member may be disposed between the groove portion and the protrusion portion, specifically, the sealing member is placed in the bottom of the groove portion, and the protrusion portion is inserted into the groove portion and then tightly presses the sealing member, so that the waterproof effect can be further enhanced.

The electric start gasoline engine adopts the waterproof motor structure, and meanwhile, the waterproof structure between the battery pack and the control panel and the waterproof structure of the battery core in the battery pack are adopted, so that short circuit and damage to parts after water enters the motor are avoided, potential safety hazards during use of the motor and potential safety hazards during use of the battery pack are eliminated, and the electrically started gasoline engine is safer and more reliable to use.

It is to be understood that although the specification has been described in terms of embodiments, not each embodiment contains an independent technical solution. Such recitation is merely for purposes of clarity and the skilled in the art should take the specification as a whole, and the technical solutions in each embodiment may be properly combined to form additional embodiments that may be appreciated by those skilled in the art.

The above detailed description is only specific to the possible embodiments of the present invention, and is not intended to limit the scope of the present invention, and all equivalent embodiments or modifications that do not depart from the spirit of the present invention are intended to be included within the scope of the present invention.

The invention claimed is:

1. A battery assembly comprising:
a battery pack;
a battery pack seat for mounting the battery pack in a locking direction, the battery pack seat having a base for achieving an electrical connection with the battery pack; and
a sealing member having a thickness and an outer circumferential periphery disposed in a direction perpendicular to the thickness, the sealing member being disposed between the battery pack and the base for preventing water from entering the battery pack and the base, the base having a first terminal being arranged on an upper surface of the base matched with the battery pack, the battery pack having a second terminal matched with the first terminal, the second terminal being arranged on an under surface of the battery pack, one of the first terminal and the second terminal passing through the sealing member to create an electrical connection with the other one of the first terminal and the second terminal, a protrusion portion being arranged on one of the under surface and the upper surface, the protrusion portion including a wall extending in the locking direction and annularly arranged around the one of the first terminal and the second terminal, the wall being spaced radially inwardly from the outer circumferential periphery of the sealing member so that the protrusion portion, upon mounting of the battery pack to the battery pack seat, axially compresses the sealing member in the locking direction along the wall and around the one of the first terminal and the second terminal to thereby reduce an amount of force required in the locking direction between the battery pack to the battery pack seat to prevent water from entering the battery pack and the base.

2. The battery assembly according to claim 1, wherein the first terminal is located on the upper surface, the second terminal being located on the under surface of the battery pack, a mounting groove being defined on one of the upper surface and the under surface, the sealing member being mounted in the mounting groove.

3. The battery assembly according to claim 2, wherein a depth of the mounting groove is less than the thickness of the sealing member.

4. The battery assembly according to claim 1, wherein the sealing member is mounted on the upper surface, the protrusion portion being located on the under surface, the second terminal being configured as a socket, the protrusion portion being configured annularly around the socket.

5. The battery assembly according to claim 1, wherein the sealing member is mounted on the under surface, the protrusion portion being located on the upper surface, the first terminal being configured as a socket, the protrusion portion being configured annularly around the socket.

6. The battery assembly according to claim 1, wherein the wall of the protrusion portion has a tip end, the sealing member including an elastic material, the tip end of the protrusion portion compressing the sealing member when the battery pack is mounted to the battery pack seat.

7. An electrically started gasoline engine comprising:
a body;
a cylinder arranged in the body;
a piston reciprocating in the cylinder;
a crankshaft linked with the piston;
a speed reducing unit driving the crankshaft to rotate during starting;
a motor driving the speed reducing unit; and
the battery assembly according to claim 1, the battery assembly supplying electric power to the motor.

8. The electrically started gasoline engine according to claim 7, further comprising a motor mounting portion and a waterproof jacket, the motor mounting portion defining a motor accommodating cavity, the motor having a first end for outputting torque and a second end opposite the first end, at least part of the first end being mounted in the motor accommodating cavity, the waterproof jacket being sleeved at the second end, the waterproof jacket having an open end and a closed end, the open end being in sealing connection with the motor mounting portion.

9. The electrically started gasoline engine according to claim 8, wherein a positioning protrusion is located on an outer side of the motor mounting portion, the open end defining a positioning groove matched with the positioning protrusion, the positioning groove being configured as a blind hole sized to surround the positioning protrusion.

10. The electrically started gasoline engine according to claim 8, wherein the second end of the motor has a plurality of first exhaust holes extending circumferentially, the waterproof jacket having a second exhaust hole offset from the first exhaust holes in a circumferential direction, an exhaust passage being defined between the waterproof jacket and the housing of the motor, the exhaust passage fluidly connecting the first exhaust holes and the second exhaust hole, the second exhaust hole being located at a lower portion of the motor.

11. The electrically started gasoline engine according to claim 8, wherein at least the open end of the waterproof jacket includes an elastic material, the open end being sleeved outside the motor mounting portion via elastic deformation.

12. The electrically started gasoline engine according to claim 8, wherein the waterproof jacket is formed as a continuous element excluding any exhaust holes.

* * * * *